Oct. 7, 1969

J. A. MACK 3,471,110

CABLE CLAMP

Filed Sept. 22, 1966

INVENTOR
JULES A. MACK

BY

ATTORNEY

United States Patent Office 3,471,110
Patented Oct. 7, 1969

3,471,110
CABLE CLAMP
Jules A. Mack, Conover, N.C., assignor, by mesne assignments, to Superior Continental Corporation, Hickory, N.C., a corporation of Delaware
Filed Sept. 22, 1966, Ser. No. 581,271
Int. Cl. F16l 3/08; H02g 7/06
U.S. Cl. 248—74                4 Claims

ABSTRACT OF THE DISCLOSURE

An aerial support clamp for "figure 8" cables of the type having a relatively stiff support wire and a parallel conductor enclosed in a common insulating jacket and connected by a parallel insulating web. The clamp comprises two separable clamp plates having correspondingly serpentine sections which are adapted to be nested when the plates are assembled. The opposed surfaces of respective plates, including the serpentine sections thereof, are provided with complementary channels which, when the plates are nested, form support wire receiving grooves. The clamping of the serpentine grooves on the support wire prevents pull-through and also, when desired, acts as a cranking device for twisting the cable into spirals.

---

This invention relates to cable clamps and consists more particularly in new and useful improvements in a cable clamp designed for use in connection with the support of "figure 8" or "messenger" cables, such for example, as employed for aerial installations.

Basically, a "figure 8" cable consists of a supporting wire member which may be either stranded or solid, and a cable core consisting of electrical conductors, the supporting member and cable core extending in parallel relation and enclosed in a common jacket of polyethylene, polyvinyl chloride, or similar material. The two members are individually insulated by the jacket and are maintained in parallel, spaced relation by a narrow web section which is integrated with the jacket. The support member may be of various diameters and strengths, determined by the weight of the cable, span length, possible sag, anticipated ice and/or wind conditions, and other problems pertaining to the design of aerial cable systems.

Since the introduction of "figure 8" wire and cable products to the communication industry, field experience has shown that there is a tendency for the cable to "dance" or "jump," particularly when the direction of the wind is transverse to the cable line. This condition is attributed to the "air-foil" of the cable cross-section. In order to minimize this tendency, it was found that by twisting or rotating the wire or cable at points where it is attached to supporting poles, effective results could be obtained. This twisting causes the cable core to rotate around the support member and introduces torsion in both the support member and cable core. This, in turn, results in spirals forming in the cable construction, which spirals migrate into the spans adjacent to the pole where the twists are introduced.

To insure the effectiveness of this twisting procedure in eliminating "dancing" of "figure 8" wire or cable, it is necessary that the spirals migrate uniformly into the spans. Experience in this respect has shown the need of a tight or bonded condition between the support member and the area of the jacket applied thereon, so that twisting will cause all of the cable components, including the support member, cable core, web, and overall jacket to rotate as a unit. This is particularly important where solid, round support members are employed. Where a mechanical or chemical bond is not achieved with the support member, the torsional forces introduced by the twisting operation only tend to rotate the cable core around the support member, and, due to relatively low rigidity of the cable core, the spirals will not migrate uniformly into the spans.

It may be noted that one satisfactory embodiment of a bonded messenger cable such as above referred to, is disclosed in U.S. Patent No. 3,267,201, issued to Brandon B. Pusey et al. on Aug. 16, 1966.

It has been found that conventional clamps for the support of "figure 8" wires and cables are inadequate to resist the torsional forces introduced into the cable construction as the result of the twisting procedure. Over a period of time, the torsional forces present in the support member, and to some extent in the cable core, cause the latter to twist into a position where it is abraded or otherwise damaged by the cable clamp. Furthermore, when the mechanical or chemical bond between the solid support member and the jacket fails, the clamps are not capable of maintaining their original torsional forces introduced into the support member as a result of the twisting operation.

It is the primary object of the present invention to provide a cable clamp which will avoid the disadvantages above referred to, and one which will offset the torsional forces experienced with "figure 8" wire and cable products.

Another object of the invention is to provide a clamp of this nature which will eliminate "dancing" of "figure 8" wire or cable and insure the uniform migration of the spirals into the spans during the twisting procedure.

Still another object of the invention is to provide a clamp for "figure 8" wire and cable which, in addition to serving as a clamp, may be effectively used as a grip or crank for the cable during the twisting operation. In other words, the clamp is designed to serve as a twisting wrench.

A further object of the invention is to provide a clamp which is designed to accommodate varying sizes of support members with a minimum of insulation crushing.

A still further object of the invention is to provide a reversible clamp having two vertically spaced, parallel, wire-receiving grooves of different diameters, and adapted to accommodate support members of different diameters by simply reversing the position of the clamp.

Another object of the invention is to provide a clamp formed of two plates having at least two opposed, longitudinally extending grooves, the intermediate portions of said plates and grooves, between their longitudinal extremities, being laterally offset to provide a gripping action which will avoid longitudinal pull-through of the support member of a "figure 8" cable.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 2:
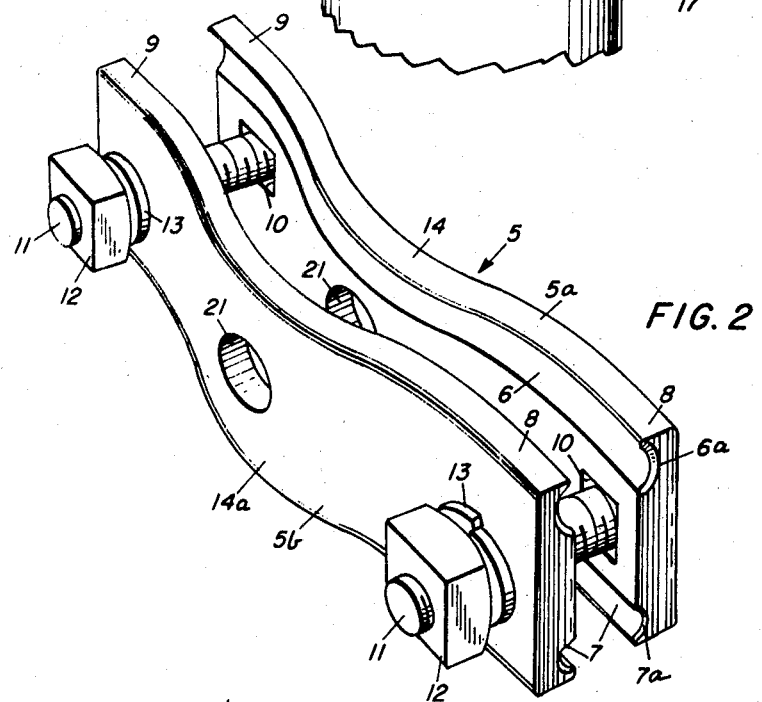
FIG. 2 is an enlarged, partially exploded, perspective view of the clamp.

Referring first to FIG. 2, the clamp, generally indicated at 5, consists of two complementary plates 5a and 5b, and in the preferred form of the invention, the opposed inner faces of these plates are provided with two vertically spaced sets of mating channels, respectively forming grooves 6 and 7, in relatively close relation to the longitudinal edges of the plates. The cross-sectional dimension of the groove 6 in the form shown, is greater than that of the groove 7, so that by bodily rotating and reversing the position of the clamp 5, different sizes of supporting wires may be accommodated by the lowermost groove, as will be hereinafter explained.

Opposite end portions 8 and 9 of the respective clamp plates lie in parallel, flat planes, and they are provided with registering, transverse openings 10 for receiving clamping bolts 11, threaded to receive nuts 12 and lock washers 13. Intermediate these end portions 8 and 9, the clamp plates are laterally offset with respect to the flat end portions to form mating, curved crank sections 14 and 14a, so that when in clamping position, the complementary clamp plates are in effect, in nested relation.

As shown in FIG. 2, the longitudinal contours of the grooves 6 and 7 follow the contours of the respective plates 5a and 5b, so that the intermediate portions of each groove are laterally offset with respect to the longitudinal extremities of such grooves. Thus, as will later appear, when the clamp plates are forced together by tightening the nuts 12 on the bolts 11 with a cable supporting member in one of the grooves 6 or 7, the support member is correspondingly offset with the groove. Due to the rigidity of the support member and the degree and length of offset provided in the clamp plates, the torsion introduced in the support member by the twisting operation previously referred to, can be maintained regardless of the degree of bond between the support member and the covering or insulation thereon. This offset not only avoids longitudinal pull-through of the support member but will maintain the spirals introduced into the spans of wire or cable on a uniform basis and will serve to substantially reduce, if not eliminate, dancing of the wire or cable when exposed to the effects of wind.

Figure 1:
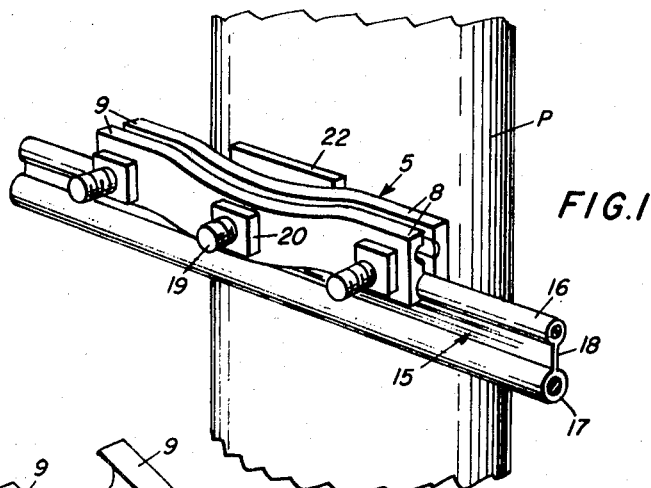
FIG. 1 is a perspective view showing the cable clamp of the present invention in cable-supporting position on a vertical pole.

In FIG. 1, the clamp is shown in operative position, supporting a "figure 8" cable, generally indicated by the numeral 15. As previously noted, these cables consist of a support wire or member 16 and a parallel, vertically spaced conductor core or member 17, respectively enclosed in a jacket of insulating material and separated by web 18, integrally formed with the jacket. In its final supporting position, the clamp is held in place on an upright pole P by a through-bolt 19, extending from the pole through aligned openings 21 in the center of the crank section 14, 14a of the respective clamp plates. Preferably, a metallic spacer 22, consisting of a washer and through-bolt nut attached to the periphery of the pole P, underlies the complementary crank sections 14, 14a of the nested plates.

In order to minimize injury to the insulating jacket enveloping the support member 16, the opposite longitudinal extremities of the grooves 6 and 7 are rounded or beveled as at 6a and 7a respectively. Thus, during the twisting operation, and under the vibrating effect of the wind, the otherwise sharp edges of the grooves are prevented from digging into the insulation covering the support member 16. In fact, as clearly shown in the drawings, the contours of the channels 6 and 7 from end to end are smoothly contoured to minimize crushing and digging into the insulation covering the support wire 16.

In the installation of this improved clamp, after the cable has been sagged or tensioned, the complementary clamp plates 5a and 5b of the selected diameter are placed over the insulation of the support wire 16 and the nuts 12 are finger-tightened on the respective bolts 11. This may be done to the left or right of the stringing hook or block and then sliding the clamp longitudinally into position under the through-bolt 19 on the pole P. The nuts 12 are then tightened to cause the support member 16 to follow the offset contour of the clamp and groove.

If the cable is to be twisted for the purposes above referred to, this operation is performed prior to mounting the clamp on the through-bolt 19, but after tightening the end nuts 12 on bolts 11. By using an auxiliary through-bolt or other leverage member introduced through the central holes 21 in the clamp, such member may serve as a twisting wrench or crank for twisting the cable. In some instances, the offset contour of the clamp itself may be sufficient to provide a twisting grip without the use of an additional bolt through the center holes. When the required number of twists have been made, the clamp is then placed on the through-bolt extending from the pole P, and the nut 20 tightened thereon to firmly secure the clamp and cable to the pole. It is preferable to torque all nuts to a desired final pressure, starting with the central nut 20 on the through-bolt 19, and thereafter the outer nuts 12.

The clamp of the present invention is designed for universal application for the support of "figure 8" cables with both solid and stranded support members. It may be used at tangent points and corners up to 30° when employed with solid support members, and for tangent points and corners up to 20° when employed with stranded support members. Preferably, the two sets of grooves provided in the clamp plates are each appropriately labeled to indicate the diameter of support member which it is designed to accommodate.

The provision of the two sets of grooves of different diameters provides a clamp capable of accommodating a wide variety of wire and cable support members employed with "figure 8" products. Popular support member sizes includes solid members having diameters of .109 inch, .134 inch, .148 inch and stranded support members having diameters of $3/16$ inch and $1/4$ inch. Conventional practices require the use of two or three different clamps to accommodate this range of support member diameters and line angles, and it is one of the objects of the present invention to reduce the number of clamps by providing these different sized grooves at the upper and lower extremities of the clamp plates. As before pointed out, by simply reversing the position of the clamp, the proper size groove may be brought in place adjacent the lower edge of the clamp.

Figure 3:
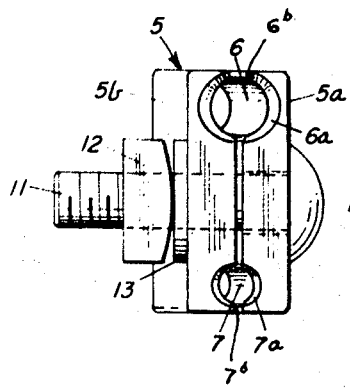
FIG. 3 is an end view of the clamp.

Preferably, as best seen in FIG. 3, the outermost longitudinal edges of the respective channels forming support wire-receiving grooves 6 and 7 are laterally spaced a greater distance than the corresponding innermost edges, to provide longitudinal clearances 6b and 7b for accommodating the thickness of the web 18 when the plates 5a and 5b are in clamping position.

From the foregoing, it is believed that the invention may be readily understood by those skilled in the art without further description, it being borne in mind that numerous changes may be made in the details disclosed without departing from the spirit of the invention.

I claim:

1. A torsion maintaining aerial support clamp for "figure 8" cables of the type having a relatively stiff support wire and a parallel conductor wire enclosed in a common insulating jacket and connected by a parallel insulating web, said clamp comprising a pair of separable, co-extensive clamp plates shaped per se, so as to terminate at their respective opposite longitudinal extremities in substantially straight, mating portions with complementary curved mating sections interposed therebetween, the opposed inner faces of each plate having at least one longitudinal channel spaced inwardly from and parallel with an edge of said plate and coacting with the channel of the opposite clamp plate to form a support wire-receiving groove, said coacting channels conforming in longitudinal contour to said straight mating portions and intervening curved portions of the clamp plates, said clamp plates adapted to be nested in clamping relation on said support wire, means for securing said plates in clamping relation on a support wire to prevent pull-through and maintain torsional forces introduced into the support wire, and means for mounting said clamp on a main support.

2. An aerial support clamp as claimed in claim 1, wherein said complementary curved sections provide a cranking grip for twisting said cable into spirals.

3. A clamp as claimed in claim 1, wherein the straight, mating portions of said plates are provided with registering apertures for receiving clamping bolts and nuts to secure said plates in clamping relation.

4. A clamp as claimed in claim 1, wherein the straight, mating portions of said plates are provided with registering apertures for receiving clamping bolts and nuts to secure said plates in clamping relation, and said curved sections are provided with registering apertures to receive a through-bolt secured to said main support.

References Cited

UNITED STATES PATENTS

| | | | |
|---|---|---|---|
| 243,513 | 6/1881 | Connor | 174—42 |
| 827,573 | 7/1906 | Sheeley | 248—74 |
| 1,937,517 | 12/1933 | Hawley | 248—63 |
| 3,333,804 | 8/1967 | James | 174—41 XR |
| 3,603,378 | 12/1964 | Goewey | 248—61 |

ROY D. FRAZIER, Primary Examiner

U.S. Cl. X.R.

174—41